US011453073B2

United States Patent
Yamada

(10) Patent No.: US 11,453,073 B2
(45) Date of Patent: Sep. 27, 2022

(54) CUTTING INSERT AND MILLING TOOL

(71) Applicant: TUNGALOY CORPORATION, Fukushima (JP)

(72) Inventor: Yosuke Yamada, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 190 days.

(21) Appl. No.: 17/037,020

(22) Filed: Sep. 29, 2020

(65) Prior Publication Data
US 2021/0114120 A1   Apr. 22, 2021

(30) Foreign Application Priority Data
Oct. 18, 2019 (JP) .............................. JP2019-190864

(51) Int. Cl.
*B23C 5/20* (2006.01)
*B23C 5/02* (2006.01)
(Continued)

(52) U.S. Cl.
CPC ............... *B23C 5/109* (2013.01); *B23C 5/02* (2013.01); *B23C 2200/0477* (2013.01); *B23C 2200/086* (2013.01); *B23C 2200/367* (2013.01)

(58) Field of Classification Search
CPC ...... B23C 2200/0477; B23C 2200/086; B23C 2200/165; B23C 2200/367;
(Continued)

(56) References Cited

U.S. PATENT DOCUMENTS 3,805,349 A * 4/1974 Nose ........................ B23C 5/202
407/114
6,146,065 A * 11/2000 Isaksson ................... B23B 5/12
407/113
(Continued)

FOREIGN PATENT DOCUMENTS

DE  10 2015 014 907 A1   5/2017
DE    112019002343 T5 *  1/2021 .......... B01F 15/0201
(Continued)

OTHER PUBLICATIONS

Kyocera Corporation, "High Performance End Mill MEV", Oct. 2019, Internet <https://www.kyocera.co.jp/prdct/tool/wp-content/uploads/2019/09/MEV.pdf>; English version <http://www.kyoceramicrotools.com/indexable/pdf/MEV_High_Performance_Milling.pdf>.

*Primary Examiner* — Sara Addisu
(74) *Attorney, Agent, or Firm* — Studebaker & Brackett PC

(57) ABSTRACT

A cutting insert includes a first end surface and a second end surface, in which a first peripheral side surface includes a first rake surface adjacent to a first main cutting edge and a first concave surface connected to the second end surface and formed to be recessed from the first rake surface toward a central axis of a through hole, and the first concave surface has a first restraint surface provided at a position where a distance between the first restraint surface and a second main cutting edge is smaller than a distance between the central axis of the through hole and the second main cutting edge, when viewed from a direction parallel to the central axis of the through hole.

6 Claims, 7 Drawing Sheets

(51) Int. Cl.
   *B23B 27/16* (2006.01)
   *B23C 5/10* (2006.01)

(58) Field of Classification Search
   CPC ..... B23C 2210/168; B23C 5/06; B23C 5/109; B23C 5/2213; B23C 5/02
   See application file for complete search history.

(56) References Cited

U.S. PATENT DOCUMENTS

| | | | |
|---|---|---|---|
| 7,775,750 B2* | 8/2010 | Satran | B23C 5/202 407/42 |
| 9,168,590 B2 | 10/2015 | Kaufmann et al. | |
| 11,273,499 B2* | 3/2022 | Lof | B23B 1/00 |
| 2009/0136304 A1* | 5/2009 | Satran | B23C 5/202 407/104 |
| 2009/0155005 A1 | 6/2009 | Jansson | |
| 2013/0108387 A1 | 5/2013 | Ishi et al. | |
| 2013/0183110 A1* | 7/2013 | Schaefer | B23B 27/164 407/113 |
| 2013/0251464 A1* | 9/2013 | Hecht | B23C 5/2213 407/113 |
| 2013/0336734 A1 | 12/2013 | Morgulis et al. | |
| 2014/0348599 A1 | 11/2014 | Kovac et al. | |
| 2017/0144235 A1* | 5/2017 | Dagan | B23C 5/06 |
| 2017/0197257 A1* | 7/2017 | Aso | B23C 5/006 |
| 2019/0054550 A1* | 2/2019 | Yoshida | B23B 27/14 |
| 2019/0314906 A1* | 10/2019 | Mihalik | B23C 5/109 |
| 2021/0283699 A1* | 9/2021 | Schmitt | B23C 5/109 |
| 2022/0001467 A1* | 1/2022 | Mao | B23C 5/109 |

FOREIGN PATENT DOCUMENTS

| | | |
|---|---|---|
| WO | 2007/149035 A1 | 12/2007 |
| WO | 2011/013115 A1 | 2/2011 |
| WO | 2012/014977 A1 | 2/2012 |
| WO | 2017/068922 A1 | 4/2017 |
| WO | 2017/085711 A1 | 5/2017 |
| WO | 2019/132162 A1 | 7/2019 |

* cited by examiner

CUTTING INSERT AND MILLING TOOL

CROSS-REFERENCES TO RELATED APPLICATIONS

This application relates to and claims priority from Japanese Patent Application No. 2019-190864 on (Oct. 18, 2019), the entire disclosure of which is incorporated herein by reference.

BACKGROUND OF THE INVENTION

Field of the Invention

The present disclosure relates to a cutting insert and a milling tool.

Description of Related Art

In the related art, a cutting insert that can achieve both low resistance and high rigidity when vertically placed has been known.

International Publication No. 2017/068922 and International Publication No. 2011/013115 disclose such a cutting insert and a milling tool mounted on the cutting insert. Further, Kyocera Corporation, "High Performance End Mill MEV", October 2019, Internet <https://www.kyocera.co.jp/prdct/tool/wp-content/uploads/2019/09/MEV.pdf> discloses an end mill having both low resistance and high rigidity.

When being mounted on a body, such a cutting insert has a large length in a circumferential direction with reference to a rotation axis of the body. Therefore, the cutting insert is supported by the body at a position separated from a cutting edge by a distance corresponding to the thickness of the cutting insert.

The inventors of the present application have focused on a problem that when the cutting insert is supported by the body at a position far away from the cutting edge, a large load is applied to a screw for fixing the cutting insert to the body, and thus a cutting edge position is not stable.

SUMMARY

The purpose of the present disclosure is to provide a cutting insert and a milling tool capable of stabilizing a cutting edge position even when a load is applied to a cutting edge.

A cutting insert according to an aspect of the present disclosure may include a first end surface and a second end surface. Further, a through hole may be formed to penetrate the first end surface and the second end surface. The cutting insert may further include: a first peripheral side surface connected to the first end surface and the second end surface; a second peripheral side surface which is connected to the first end surface, the second end surface, and the first peripheral side surface, and is formed to be rotationally symmetric to the first peripheral side surface with respect to a central axis of the through hole; a third peripheral side surface which is connected to the first end surface, the second end surface, and the second peripheral side surface, and is formed to be rotationally symmetric to the second peripheral side surface with respect to the central axis of the through hole; a first main cutting edge formed at a connection portion between the first end surface and the first peripheral side surface; a second main cutting edge formed at a connection portion between the first end surface and the second peripheral side surface; and a third main cutting edge formed at a connection portion between the first end surface and the third peripheral side surface. Further, the first peripheral side surface may include a first rake surface adjacent to the first main cutting edge, and a first concave surface which is connected to the second end surface and is formed to be recessed from the first rake surface toward the central axis of the through hole, the first concave surface has a first restraint surface provided at a position where a distance between the first restraint surface and the second main cutting edge is smaller than a distance between the central axis of the through hole and the second main cutting edge when viewed from a direction parallel to the central axis of the through hole, the second peripheral side surface has a second concave surface and a second restraint surface formed to be rotationally symmetric to the first concave surface and the first restraint surface with respect to the central axis of the through hole, respectively, and the third peripheral side surface has a third concave surface and a third restraint surface formed to be rotationally symmetric to the second concave surface and the second restraint surface with respect to the central axis of the through hole, respectively.

According to such a configuration, when cutting is performed using the second main cutting edge, it is possible to support the cutting insert using the first concave surface provided on the first peripheral side surface corresponding to the first main cutting edge. The first concave surface has the first restraint surface provided at a position where a distance between the first restraint surface and the second main cutting edge is smaller than a distance between the central axis of the through hole and the second main cutting edge, when viewed from the direction parallel to the central axis of the through hole. Therefore, by supporting the cutting insert using the first restraint surface, it is possible to reduce a moment acting on the first restraint surface. As the distance between the first restraint surface and the second main cutting edge becomes smaller when viewed from the direction parallel to the central axis of the through hole, the moment acting on the first restraint surface can become smaller. Thus, it is preferable that this distance be a half or less of the distance between the central axis of the through hole and the second main cutting edge when viewed from the direction parallel to the central axis of the through hole. However, it should be noted that when the distance between the first restraint surface and the second main cutting edge is made too small, the rigidity is reduced.

Here, the distance between the central axis of the through hole and the second main cutting edge when viewed from the direction parallel to the central axis of the through hole is the minimum distance between the central axis of the through hole and the second main cutting edge when viewed from the direction parallel to the central axis of the through hole. However, the second main cutting edge is not necessarily a straight line. Further, the distance between the first restraint surface and the second main cutting edge when viewed from the direction parallel to the central axis of the through hole is the minimum distance between the first restraint surface and the second main cutting edge when viewed from the direction parallel to the central axis of the through hole. The first restraint surface may have a flat surface portion, but may be configured by a curved surface.

Further, the second peripheral side surface may be formed to be rotationally symmetric to the first peripheral side surface by 120 degrees, the third peripheral side surface may be formed to be rotationally symmetric to the second peripheral side surface by 120 degrees, and the first peripheral side surface may be formed to be rotationally symmetric to the third peripheral side surface by 120 degrees.

According to such a configuration, when the cutting is performed using the second main cutting edge, it is possible to support the cutting insert by using the first restraint surface of the first concave surface and the third concave surface. Further, when the cutting is performed using the third main cutting edge, it is possible to support the cutting insert by using the second restraint surface of the second concave surface and the first concave surface. Further, when the cutting is performed using the first main cutting edge, it is possible to support the cutting insert by using the third restraint surface of the third concave surface and the second concave surface.

Further, the cutting insert may further include: a first sub-cutting edge formed at a connection portion between the first peripheral side surface and the second peripheral side surface; a second sub-cutting edge formed at a connection portion between the second peripheral side surface and the third peripheral side surface; and a third sub-cutting edge formed at a connection portion between the third peripheral side surface and the first peripheral side surface.

According to such a configuration, since a bottom surface, a wall surface, and the like can be simultaneously cut using the main cutting edge and the sub-cutting edge, the cutting insert which can be preferably used for a milling tool such as a milling cutter and an end mill can be provided.

A corner cutting edge that connects the main cutting edge and the sub-cutting edge may be provided between the main cutting edge and the sub-cutting edge. As in a cutting insert for a radius end mill, the corner cutting edge may have a large radius of curvature. Further, the sub-cutting edge may be provided such that a ramping process can be performed.

The first concave surface may have a first sub-restraint surface provided at a position where a distance between the first sub-restraint surface and the second main cutting edge is larger than the distance between the central axis of the through hole and the second main cutting edge when viewed from the direction parallel to the central axis of the through hole, the second concave surface may have a second sub-restraint surface formed to be rotationally symmetric to the first sub-restraint surface with respect to the central axis of the through hole, and the third concave surface may have a third sub-restraint surface formed to be rotationally symmetric to the second sub-restraint surface with respect to the central axis of the through hole.

According to such a configuration, when the cutting is performed using the second main cutting edge, the cutting insert can be supported using the first restraint surface of the first concave surface and the third sub-restraint surface of the third concave surface. Further, the cutting insert can be supported using the third restraint surface of the third concave surface and the second sub-restraint surface of the second concave surface when the cutting is performed using the first main cutting edge or using the second restraint surface of the second concave surface and the first sub-restraint surface of the first concave surface when the cutting is performed using the third main cutting edge.

Further, the first concave surface may have a first bottom surface facing the same direction as the second end surface, and a first wall surface standing up from the first bottom surface and connected to the second end surface, the first wall surface may have the first restraint surface, the first restraint surface may have a first flat surface portion, and an angle formed between the first flat surface portion and the second main cutting edge may be −40 degrees or more and 40 degrees or less when viewed from a direction parallel to the central axis of the through hole.

With such a configuration, since the first restraint surface is a surface facing a direction in which the cutting insert rotates, it is possible to preferably receive the cutting resistance acting on the second main cutting edge. Further, since an angle formed between the first flat surface portion and the second main cutting edge is −40 degrees or more and 40 degrees or less, as compared to a case where the angle has any other value, it is possible to preferably receive the cutting resistance acting in a direction perpendicular to a rotation axis of the body when viewed from the direction parallel to the central axis of the through hole.

Further, when viewed from the direction parallel to the central axis of the through hole, the first flat surface portion may be formed to be closer to the second main cutting edge as the first flat surface portion is farther from the first main cutting edge.

According to such a configuration, when the cutting insert is attached to the body such that the second main cutting edge has a positive axial rake, it is possible to make the first restraint surface rather than the second main cutting edge approach the rotation axis of the body in parallel to the rotation axis of the body. Therefore, when viewed from the direction parallel to the central axis of the through hole, it is possible to preferably receive the cutting resistance acting in the direction perpendicular to the rotation axis of the body.

Further, the first wall surface may have a first sub-restraint surface, the first sub-restraint surface may have a first sub-flat surface portion, and when viewed from a direction facing the second end surface parallel to the central axis of the through hole, an angle of the first sub-flat surface portion with respect to the first flat surface portion may be 0 degrees or more and 90 degrees or less.

According to such a configuration, when the cutting is performed using the second main cutting edge, the cutting insert can be supported using the first restraint surface of the first concave surface and the third sub-restraint surface of the third concave surface. In particular, if the first concave surface and the third concave surface are provided to be rotationally symmetric to each other by 120 degrees, when viewed from the direction facing the second end surface parallel to the central axis of the through hole, an angle between the third sub-restraint surface and the second main cutting edge can be 0 degrees or more and 90 degrees or less. Therefore, the cutting insert can be stably supported in cooperation with the first sub-restraint surface of the first concave surface. Similarly, the cutting insert can be stably supported using the third restraint surface of the third concave surface and the second sub-restraint surface of the second concave surface when the cutting is performed using the first main cutting edge or using the second restraint surface of the second concave surface and the first sub-restraint surface of the first concave surface when the cutting is performed using the third main cutting edge.

Further, a milling tool according to an aspect of the present disclosure may include such a cutting insert, and a body which rotates about a rotation axis and to which the cutting insert is attached.

According to such a milling tool, even when a load is applied to the cutting edge, the cutting edge position can be stabilized.

Further, the cutting insert attached to the body that rotates about the rotation axis may include a first end surface facing an outer diameter direction when attached to the body and a second end surface facing an inner diameter direction when attached to the body, in which a through hole penetrating the first end surface and the second end surface is formed, the cutting insert further includes a first peripheral side surface that connects the first end surface and the second end surface and faces a rotation direction when attached to the body, a first main cutting edge formed at a connection portion between the first peripheral side surface and the first end surface, and a second peripheral side surface that connects the first end surface and the second end surface and faces a rotation axis direction from a base end to a tip of the body when attached to the body, and the second peripheral side surface may have a concave surface that is recessed toward a central axis of the through hole and is provided with a first restraint surface such that a distance between the first restraint surface and the first main cutting edge is smaller than a distance between the central axis of the through hole and the first main cutting edge when viewed from the direction parallel to the central axis of the through hole.

Further, the cutting insert may include a second main cutting edge formed at a connection portion between the second peripheral side surface and the first end surface, a third peripheral side surface connecting the first end surface and the second end surface, and a third main cutting edge formed at a connection portion between the third peripheral side surface and the first end surface, in which the first main cutting edge, the second main cutting edge, and the third main cutting edge are formed to be rotationally symmetric to the central axis of the through hole by 120 degrees, and the first peripheral side surface, the second peripheral side surface having the concave surface, and the third peripheral side surface are formed to be rotationally symmetric to the central axis of the through hole by 120 degrees.

Further, the concave surface may be connected to the second end surface, and the area of the first end surface may be larger than the area of the second end surface.

Further, the cutting insert may further include a first sub-cutting edge formed at a connection portion between the first peripheral side surface and the second peripheral side surface, and a first corner cutting edge connected to the first sub-cutting edge and the first main cutting edge.

DETAILED DESCRIPTION

Embodiments of the present disclosure will be described below with reference to the drawings. The following embodiments are examples for explaining the present disclosure, and are not intended to limit the present disclosure only to the embodiments.

Figure 1:
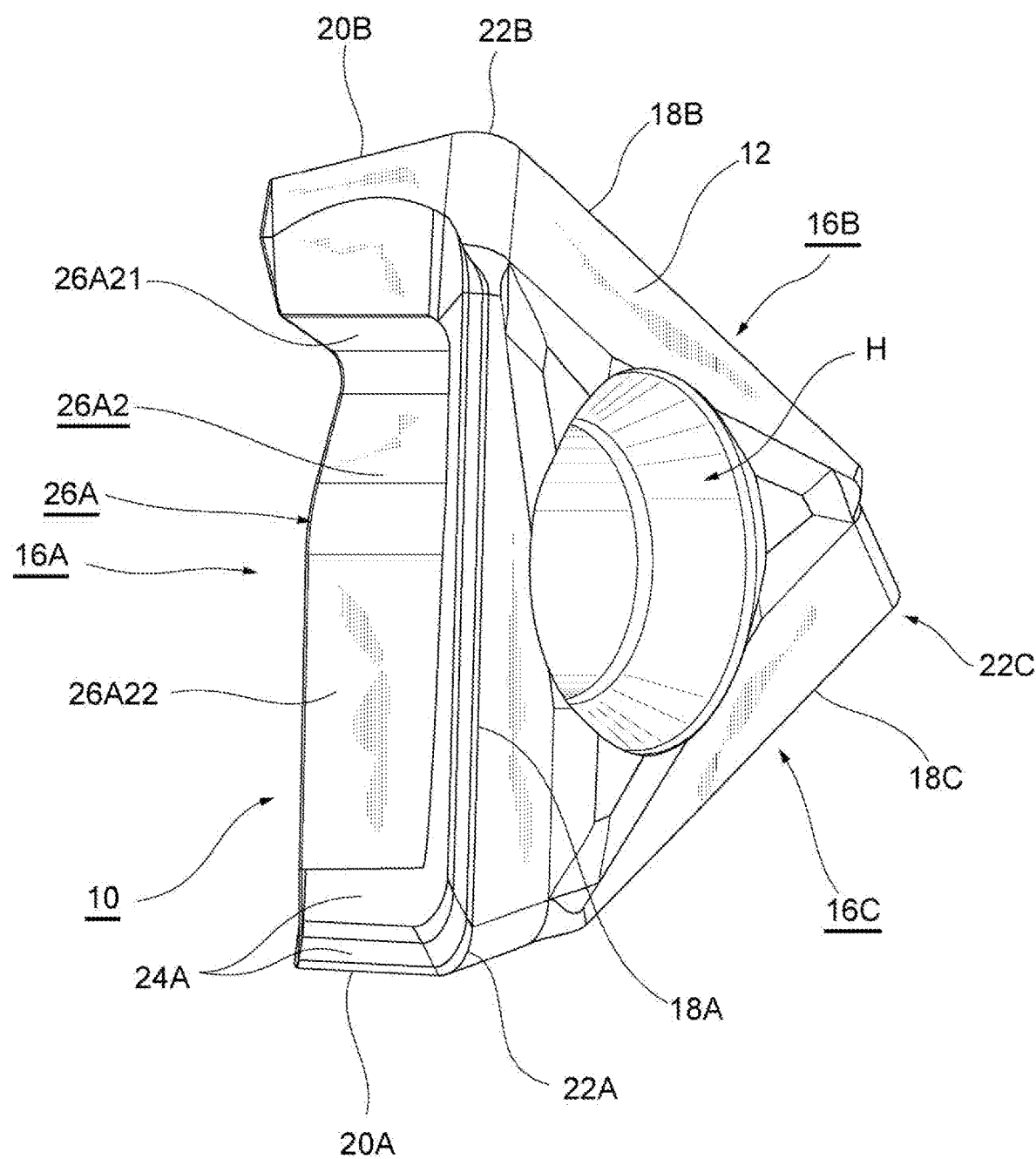
FIG. 1 is a perspective view of a cutting insert when viewed from a first end surface side.
Figure 2:
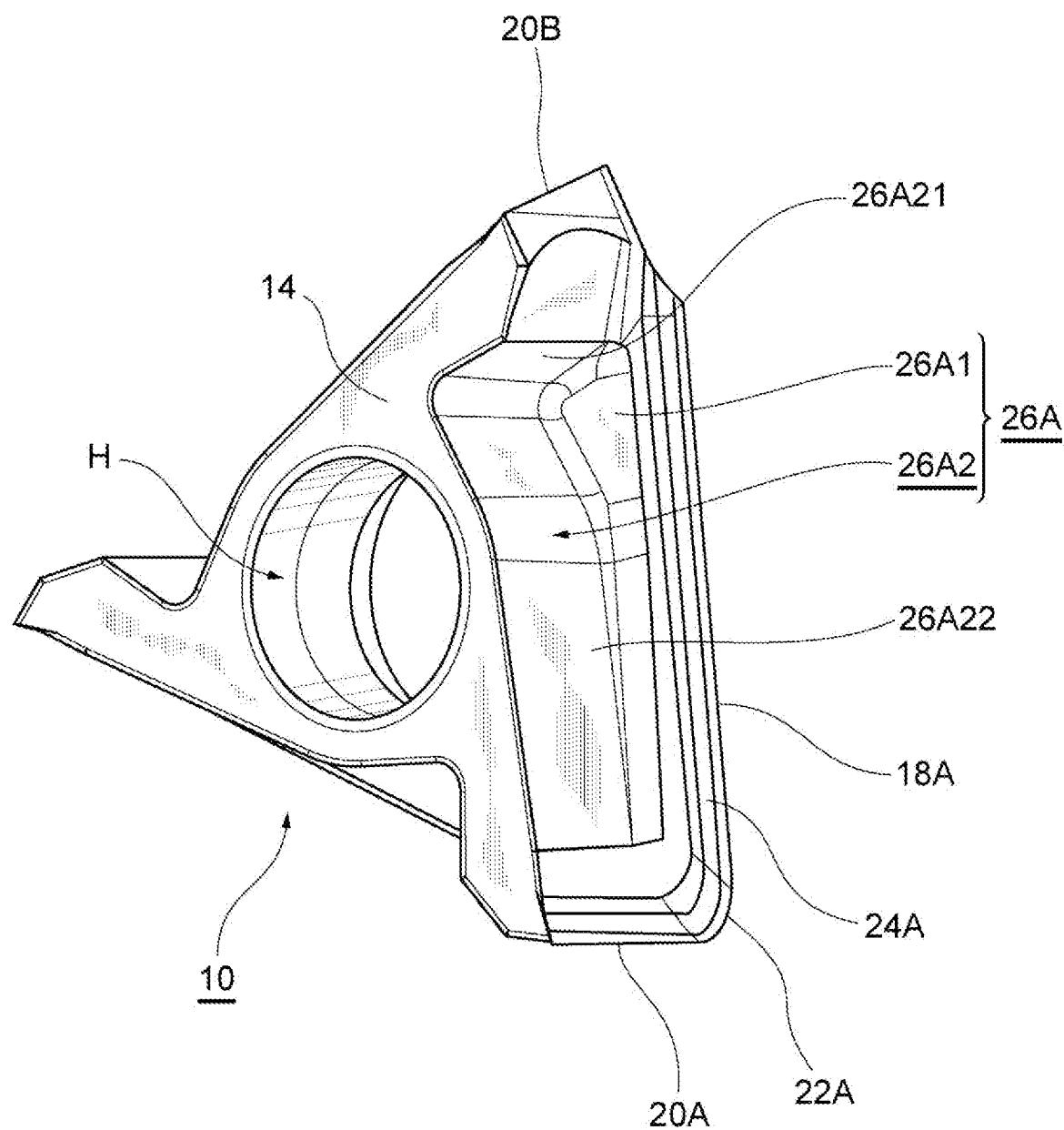
FIG. 2 is a perspective view of the cutting insert when viewed from a second end surface side.
Figure 3:
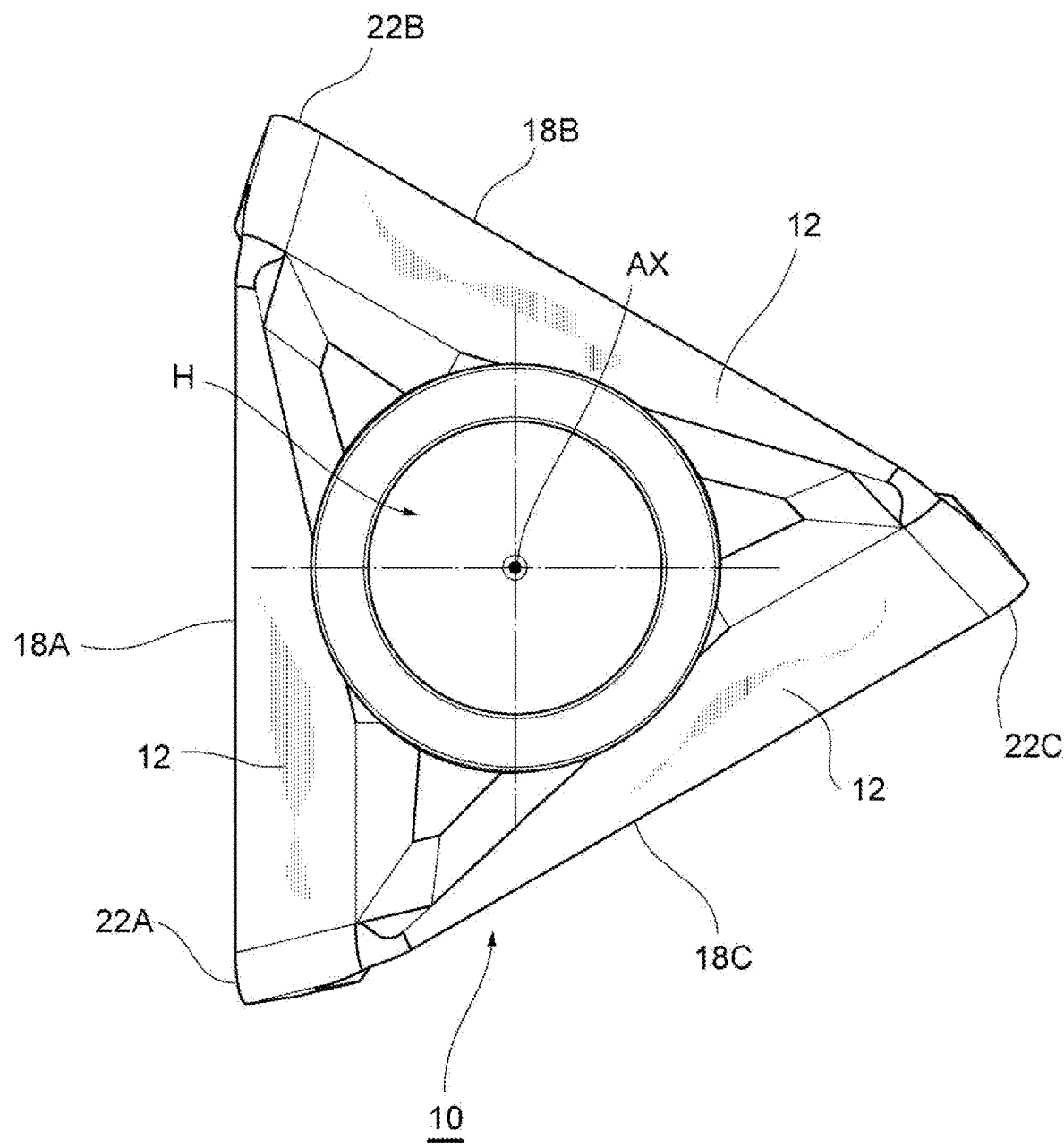
FIG. 3 is a plan view of the cutting insert.
Figure 4:
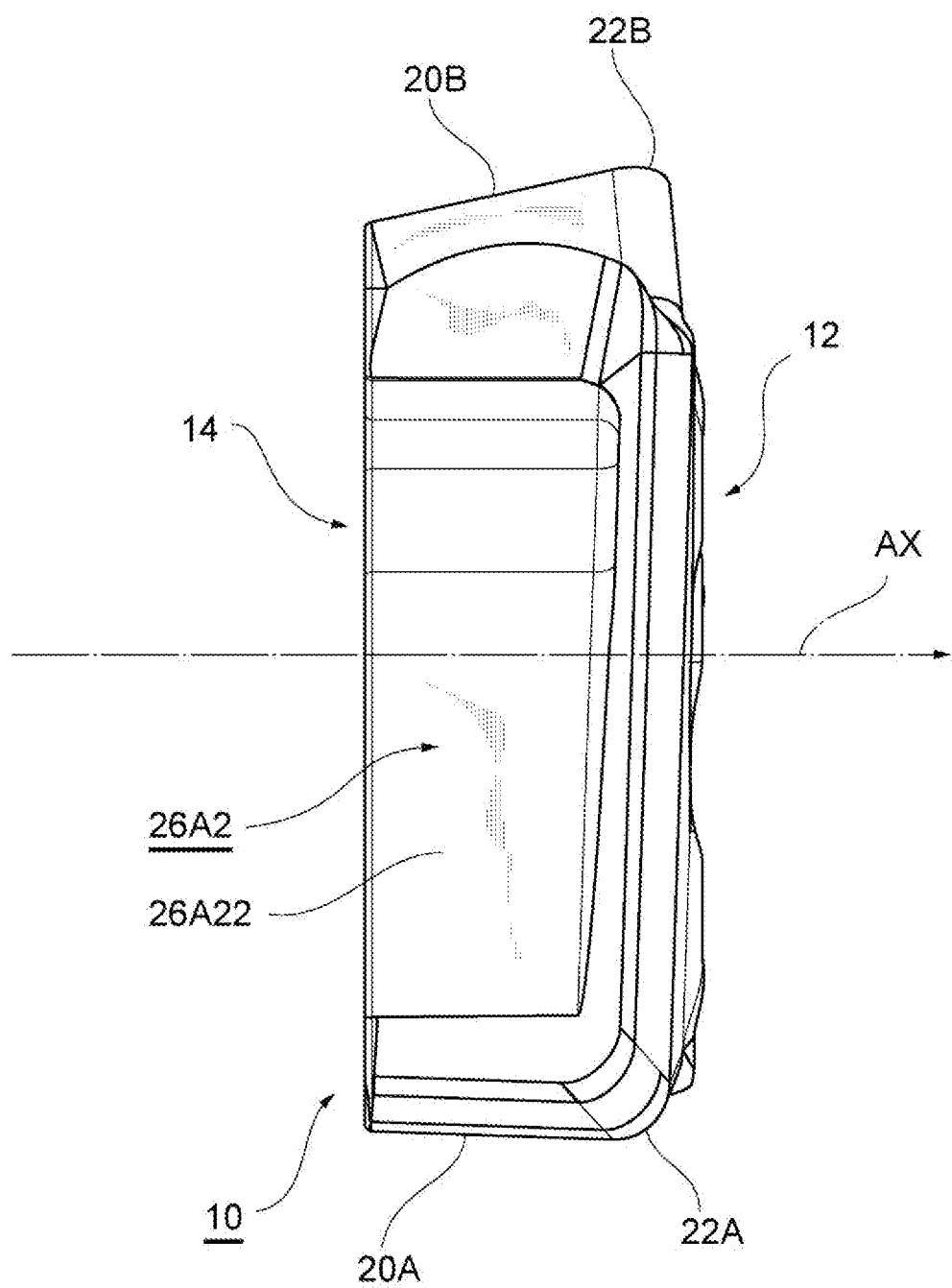
FIG. 4 is a left side view of the cutting insert.
Figure 5:
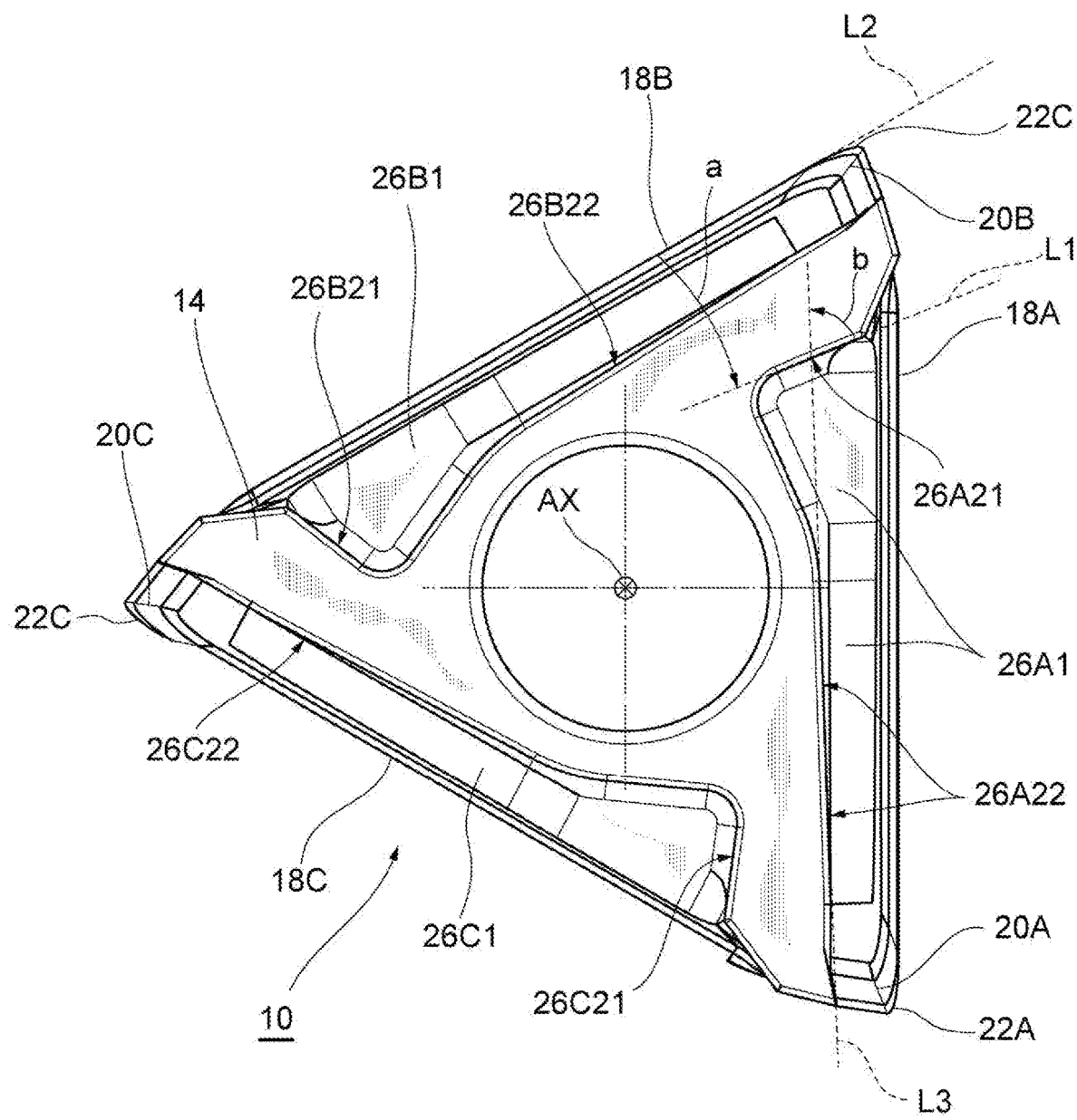
FIG. 5 is a rear view of the cutting insert.

FIG. 1 is a perspective view of a cutting insert 10 according to the embodiment when viewed from a first end surface 12 side. FIG. 2 is a perspective view of the cutting insert 10 when viewed from a second end surface 14 side. Further, FIGS. 3 to 5 are a plan view, a left side view, and a rear view of the cutting insert 10, respectively.

The first end surface 12 of the cutting insert 10 has a surface functioning as flanks of a first main cutting edge 18A, a second main cutting edge 18B, and a third main cutting edge 18C. The first end surface 12 is formed, for example, in a triangular shape, and includes three corner portions corresponding to the vertices and three sides connecting the vertices. The second end surface 14 (FIG. 2) is formed in a direction opposite to the first end surface 12. Further, the cutting insert 10 is provided with a through hole H penetrating the center of the first end surface 12 and the center of the second end surface 14. A central axis AX (FIG. 3) of the through hole H is substantially perpendicular to the first end surface 12 and the second end surface 14.

The cutting insert 10 is formed rotationally symmetrically with respect to the central axis AX of the through hole H by 120 degrees. Therefore, a first peripheral side surface 16A, a second peripheral side surface 16B, and a third peripheral side surface 16C are formed rotationally symmetrically to each other by 120 degrees. Similarly, a first main cutting edge 18A, a second main cutting edge 18B, and a third main cutting edge 18C and a first sub-cutting edge 20A, a second sub-cutting edge 20B, and a third sub-cutting edge 20C are formed rotationally symmetrically to each other by 120 degrees, respectively, and include the same structure.

The first peripheral side surface 16A is connected to the first end surface 12 and the second end surface 14 at an end portion in a direction of the central axis AX. Further, the first peripheral side surface 16A is connected to the second peripheral side surface 16B and the third peripheral side surface 16C at a circumferential end portion with reference to the central axis AX. Further, the first main cutting edge 18A, the second main cutting edge 18B, and the third main cutting edge 18C are formed in connection portions between the first end surface 12, the first peripheral side surface 16A, the second peripheral side surface 16B, and the third peripheral side surface 16C, respectively.

Further, the first sub-cutting edge 20A is formed at a connection portion between the first peripheral side surface 16A and the third peripheral side surface 16C, the third sub-cutting edge 20C is formed at a connection portion between the third peripheral side surface 16C and the second peripheral side surface 16B, and the second sub-cutting edge 20B is formed at a connection portion between the second peripheral side surface 16B and the first peripheral side surface 16A.

Further, a first corner cutting edge 22A formed in a circular arc shape or an arc shape to be connected to the first main cutting edge 18A at one end and the first sub-cutting edge 20A at the other end is formed at a corner portion connecting the first main cutting edge 18A and the first sub-cutting edge 20A. However, the curvature of the first corner cutting edge 22A may not be constant, and for example, the curvature may be configured to gradually increase or decrease partially or entirely so as to be connected to the first main cutting edge 18A or the first sub-cutting edge 20A. Similarly, a corner cutting edge 22B and a corner cutting edge 22C are formed to be rotational symmetric to the first corner cutting edge 22A.

As illustrated in FIGS. 1 and 2, the first peripheral side surface 16A includes a first rake surface 24A adjacent to the first main cutting edge 18A, the first sub-cutting edge 20A, and the first corner cutting edge 22A, a first concave surface 26A formed to be recessed from the first rake surface 24A toward the central axis AX of the through hole H, and a flank of the second sub-cutting edge 20B formed adjacent to the second sub-cutting edge 20B.

The first concave surface 26A has a first bottom surface 26A1 connected to the first rake surface 24A and formed in the same direction as the second end surface 14 (FIGS. 2 and 5) and a first wall surface 26A2 standing up from the first bottom surface 26A1 and connected to the second end surface 14. As illustrated in FIGS. 2 and 5, the first wall surface 26A2 includes a first restraint surface 26A21 and a first sub-restraint surface 26A22.

The first restraint surface 26A21 is a surface that can restrain movement of the cutting insert 10 with respect to a body 50 by abutting on and being supported by the body 50 when cutting is performed with the second main cutting edge 18B as a cutting edge.

As illustrated in FIG. 5, when the cutting insert 10 is viewed from a direction facing the second end surface 14 which is a direction parallel to the central axis AX of the through hole H, a distance between the first restraint surface 26A21 and the second main cutting edge 18B is smaller than a distance (the minimum length of a line segment connecting the two members. The same manner is applied to the following) between the central axis AX of the through hole H and the second main cutting edge 18B. Therefore, when the cutting is performed with the second main cutting edge 18B as a cutting edge, it is possible to preferably receive cutting resistance acting on the second main cutting edge 18B. With respect to a distance of a line segment connecting the first restraint surface 26A21 and the second main cutting edge 18B, since the smaller distance can exhibit a function as a restraint surface within a range in which rigidity can be maintained, the first restraint surface 26A21 is formed such that the distance is preferably 70% or less of the distance between the central axis AX of the through hole H and the second main cutting edge 18B, and is further preferably 50% or less of the distance between the central axis AX of the through hole H and the second main cutting edge 18B. However, this does not prevent a part, for example, a peripheral part, of the first restraint surface 26A21, from having a region outside the above range.

The first restraint surface 26A21 is formed to include, for example, a flat surface portion (an example of a "first flat surface portion") substantially parallel to the central axis AX of the through hole H. In that case, as illustrated in FIG. 5, it is possible to draw a straight line L1 passing through the flat surface portion of the first restraint surface 26A21. On the other hand, the second main cutting edge 18B is formed to have, for example, a linear shape when viewed from a direction parallel to the central axis AX of the through hole H. In this case, as illustrated in the drawing, it is possible to draw a straight line L2 that approximates the second main cutting edge 18B. When viewed from a direction parallel to the central axis AX of the through hole H, for example, the flat surface portion of the first restraint surface 26A21 is formed to be closer to the second main cutting edge 18B as the flat surface portion is farther from the first main cutting edge 18A. With such a configuration, when the cutting is performed using the second main cutting edge 18B, if the cutting insert 10 is attached to the body 50 such that an axial rake becomes positive, an angle formed between the flat surface portion of the first restraint surface 26A21 and an axial direction of a rotation axis of the body 50 can be closer to a parallel state, as compared to a case where the flat surface portion of the first restraint surface 26A21 is provided parallel to the first main cutting edge 18A. Therefore, the flat surface portion of the first restraint surface 26A21 can preferably receive cutting resistance acting in a direction perpendicular to the rotation axis of the body 50.

However, the angle formed between the flat surface portion of the first restraint surface 26A21 is not limited to the above, the flat surface portion may be formed such that an angle a (FIG. 5) of the straight line L1 with reference to the straight line L2 is more than −60 degrees and less than 60 degrees, the flat surface portion may be formed such that the angle a is preferably −40 degrees or more and 40 degrees or less, and the flat surface portion may be formed such that the angle a is more preferably 0 degrees or more and −10 degrees or less. FIG. 5 illustrates a case where the angle a is −10 degrees or less. In FIG. 5, the angle of the straight line L1 with reference to the straight line L2 is determined such that the angle of the straight line L1 with respect to the straight line L2 is positive in a counterclockwise direction and is negative in a clockwise direction. Further, the first restraint surface 26A21 may be configured by only a curved surface or a flat surface and a curved surface. For example, the first restraint surface 26A21 may have a curved surface at an end portion of the flat surface portion, and may be configured such that even a curved surface portion can abut on the body 50. In the present embodiment, the first restraint surface 26A21 is configured to be visible from the second end surface 14. However, the present disclosure is not limited thereto. Even when the first restraint surface 26A21 cannot be seen from the second end surface 14, a surface of the first concave surface 26A corresponding to the first restraint surface 26A21 can be configured in the same manner as described above. For example, the cutting insert may be provided to have the same configuration in a cross section perpendicular to the central axis AX of the through hole H.

The first sub-restraint surface 26A22 is a surface which can restrain movement of the cutting insert 10 with respect to the body 50 by abutting on and being supported by the body 50 when the cutting is performed with the third main cutting edge 18C as a cutting edge.

As illustrated in FIG. 5, when the cutting insert 10 is viewed from a direction facing the second end surface 14 that is a direction parallel to the central axis AX of the through hole H, a distance between the first sub-restraint surface 26A22 and the second main cutting edge 18B is larger than a distance between the central axis AX of the through hole H and the second main cutting edge 18B. On the other hand, a distance between the first sub-restraint surface 26A22 and the third main cutting edge 18C is smaller than a distance between the central axis AX of the through hole H and the third main cutting edge 18C. Therefore, when the cutting is performed with the third main cutting edge 18C as a cutting edge, it is possible to preferably receive the cutting resistance acting on the third main cutting edge 18C. That is, when viewed from a direction parallel to the central axis AX of the through hole H, the first concave surface 26A can be used as a restraint surface when the cutting is performed using the second main cutting edge 18B since the first concave surface 26A has the first restraint surface 26A21 formed at a position having a smaller distance to the second main cutting edge 18B than the distance between the central axis AX of the through hole H and the second main cutting edge 18B, and can be used as a restraint surface when the cutting is performed using the third main cutting edge 18C since the first concave surface 26A has the first sub-restraint surface 26A22 formed at a position having a smaller distance to the third main cutting edge 18C than the distance between the central axis AX of the through hole H and the third main cutting edge 18C.

The first sub-restraint surface 26A22 is formed to include, for example, a flat surface portion (an example of a "first sub-flat surface portion") substantially parallel to the central axis AX of the through hole H. In that case, as illustrated in FIG. 5, it is possible to draw a straight line L3 passing through the flat surface portion of the first sub-restraint surface 26A22. It is preferable that an angle b of the straight line L3 with reference to the straight line L1 be 0 degrees or more and 90 degrees or less. With this configuration, for example, when the cutting is performed using the second main cutting edge 18B, it is possible to support the cutting insert 10 from two different directions of the first restraint surface 26A21 and a third sub-restraint surface 26C22. The first sub-restraint surface 26A22 may be configured by only a curved surface or a flat surface and a curved surface. For example, the first sub-restraint surface 26A22 may have a curved surface at an end portion of the flat surface portion, and may be configured such that even a curved surface portion can abut on the body 50. In the present embodiment, the first sub-restraint surface 26A22 is configured to be visible from the second end surface 14. However, the present disclosure is not limited thereto. Even when the first sub-restraint surface 26A22 cannot be seen from the second end surface 14, a surface corresponding to the first sub-restraint surface 26A22 can be configured in the same manner as described above. For example, the cutting insert may be provided such that a distance between a projection line of the main cutting edge 18A and a straight line or a curved line constituting the first restraint surface 26A21 and the first sub-restraint surface 26A22 in a cross section perpendicular to the central axis AX of the through hole H has the above-described relationship.

The first wall surface 26A2 has a connection surface that connects the first restraint surface 26A21 and the first sub-restraint surface 26A22. The connection surface is a surface that faces the surface of the body 50 while being apart adjacently when the cutting insert 10 is attached to the body 50.

The second peripheral side surface 16B and the third peripheral side surface 16C have the same configuration that is rotationally symmetrical with the first peripheral side surface 16A, including the constituent elements such as the second concave surface 26B and the third concave surface 26C included therein. These constituent elements are given the same reference numeral except that the beginning thereof is the second or the third and the alphabet at the end is B or C, and detailed description thereof will be omitted.

The action and effect of the cutting insert 10 including the above-described configuration will be described.

In general, when a vertical cutting insert is mounted on the body, the thickness of the cutting insert, that is, the length in a circumferential direction with reference to the rotation axis of the body, is large. Therefore, in order to prevent a rotational rear end portion of the cutting insert from colliding with an object to be cut, the cutting insert is often mounted on the body in a state in which a radial rake has a negative value or a value close to a negative value. However, when the radial rake has a negative value or a value close to a negative value and the cutting insert is mounted on the body, if the cutting edge comes into contact with the object to be cut, large cutting resistance acts in a direction away from the body. Therefore, a large load is applied to a screw for fixing the cutting insert to the body, and thus it is not easy to stabilize the cutting edge position of the cutting edge. In the related art, the problem is solved by causing the most region of the outer peripheral surface of the cutting insert to abut on the body as a restraint surface.

However, as a result of analysis by the inventors of the present application, it is noted that in the configuration according to the related art, when a large cutting resistance acts, the cutting edge position may deviate from an original position. Further, it is noted that when the cutting insert is formed in a triangular shape, the rotational rear end portion of the cutting insert is pressed against the body like a wedge and thus it is difficult to take out the cutting insert, and since the cutting insert is asymmetric in the vertical direction, the cutting insert may be displaced downward when being pressed against the body.

On the other hand, the cutting insert 10 according to the present embodiment is provided with the first restraint surface 26A21 and the like that can abut on the body 50 at a position having a smaller distance to the main cutting edge 18B used for the cutting than a distance between the main cutting edge 18B and the central axis AX of the through hole H corresponding to the center of an inscribed circle of the cutting insert 10 when viewed from an opposite direction from the first end surface 12 or the second end surface 14. Therefore, when the cutting is performed with the main cutting edge 18B as a cutting edge, a moment acting on the first restraint surface 26A21 or the like can be smaller as compared to a case where a restraint surface is provided at a position separated from the main cutting edge 18B or the like by the same distance as the distance between the central axis AX of the through hole H and the main cutting edge 18B. Further, the first restraint surface 26A21 or the like is provided at a position close to the first corner cutting edge 22A and the like of the main cutting edge 18B or the like. Therefore, when the cutting edge is bitten, since the first corner cutting edge 22A or the like or the vicinity thereof firstly comes into contact with a cutting material, it is possible to appropriately receive the cutting resistance at a position where large cutting resistance can be received. Therefore, as compared to the related art, it is possible to suppress the positional deviation due to the cutting resistance.

Further, the first restraint surface 26A21 or the like is provided to face the rotational direction of the body 50, that is, to be parallel to or almost parallel to the central axis AX of the through hole H. Thus, the first restraint surface 26A21 and the body 50 can abut on each other in a direction in which the rigidity of the body 50 is large, so that it is possible to more appropriately suppress the positional deviation.

Further, the cutting insert 10 can be supported by the third sub-restraint surface 26C22 or the like provided at a position and an angle different from those of the first restraint surface 26A21 or the like. In this way, the cutting insert 10 can be supported by one or two or more surfaces that are independent of the first restraint surface 26A21 or the like, so that it is possible to suppress the positional deviation due to the cutting resistance. In particular, since the third sub-restraint surface 26C22 or the like is provided at a position having a smaller distance to the main cutting edge 18B used for the cutting than a distance between the central axis AX of the through hole H and the main cutting edge 18B or the like, similarly, the moment acting on the third sub-restraint surface 26C22 or the like can be reduced.

Further, for example, when the main cutting edge 18B is used for the cutting, the second concave surface 26B is provided on the second peripheral side surface 16B having a rake surface. Therefore, as compared with a case where the second concave surface 26B is not provided, it is possible to suppress the obstruction of chip discharge. In particular, even when the radial rake is made negative, it is possible to suppress the obstruction of chip discharge.

Further, since the body 50 that supports the cutting insert 10 is formed with the first concave surface 26A or the like, it is possible to increase the rigidity in the circumferential direction and in the radial direction with reference to the rotation axis as compared to a body according to the related art. As described above, using the cutting insert 10, it is possible to increase the rigidity of the body that supports the cutting insert 10.

Further, the cutting insert 10 can be configured so as not to abut on the body on the first end surface 12 side which is a flank of the first main cutting edge 18A or the like. Therefore, it is possible to change a clearance angle as compared with a cutting insert that is restrained by abutting on the body on an end surface on the flank side. Therefore, the cutting insert 10 can perform cutting with an optimal clearance angle according to various cutting materials and processing purposes. For example, it is possible to increase the clearance angle in order to improve the weldability or to decrease the clearance angle in order to provide the edge strength.

Further, in the cutting insert 10, the area of the second end surface 14 is smaller than the area of the first end surface 12. Therefore, for example, when the cutting insert 10 is used as an insert for a roughing end mill or the like, the number of edges (the number of attached cutting inserts 10) can be increased.

The cutting insert 10 can be deformed within a range in which the ordinary creativity of those skilled in the art is exhibited. For example, a portion that is not related to the present disclosure may include a portion that is not rotationally symmetrical. Further, a land may be formed adjacent to the first main cutting edge 18A, the second main cutting edge 18B, and the third main cutting edge 18C.

Figure 6:
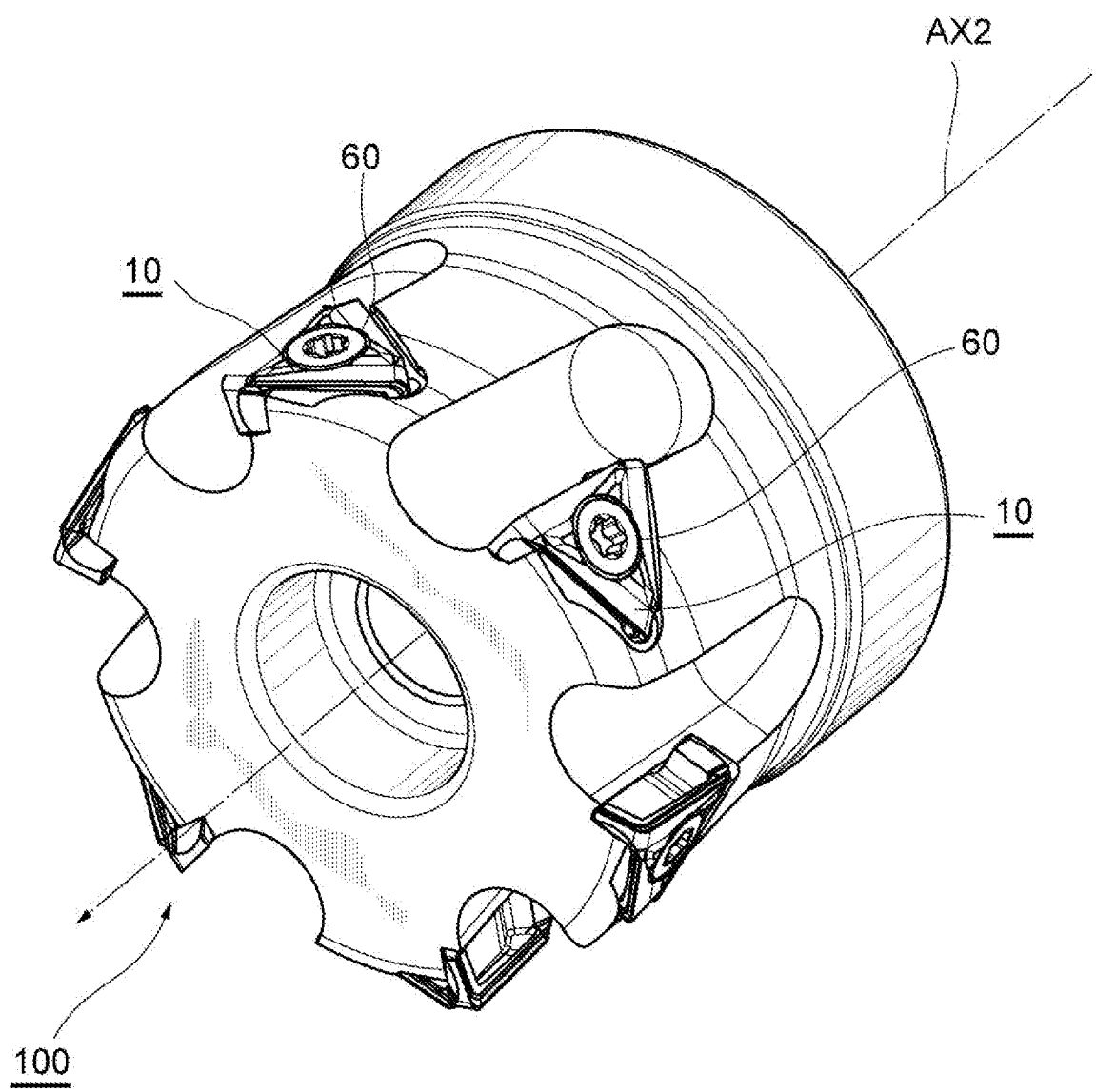
FIG. 6 is a perspective view of a milling cutter.
Figure 7:
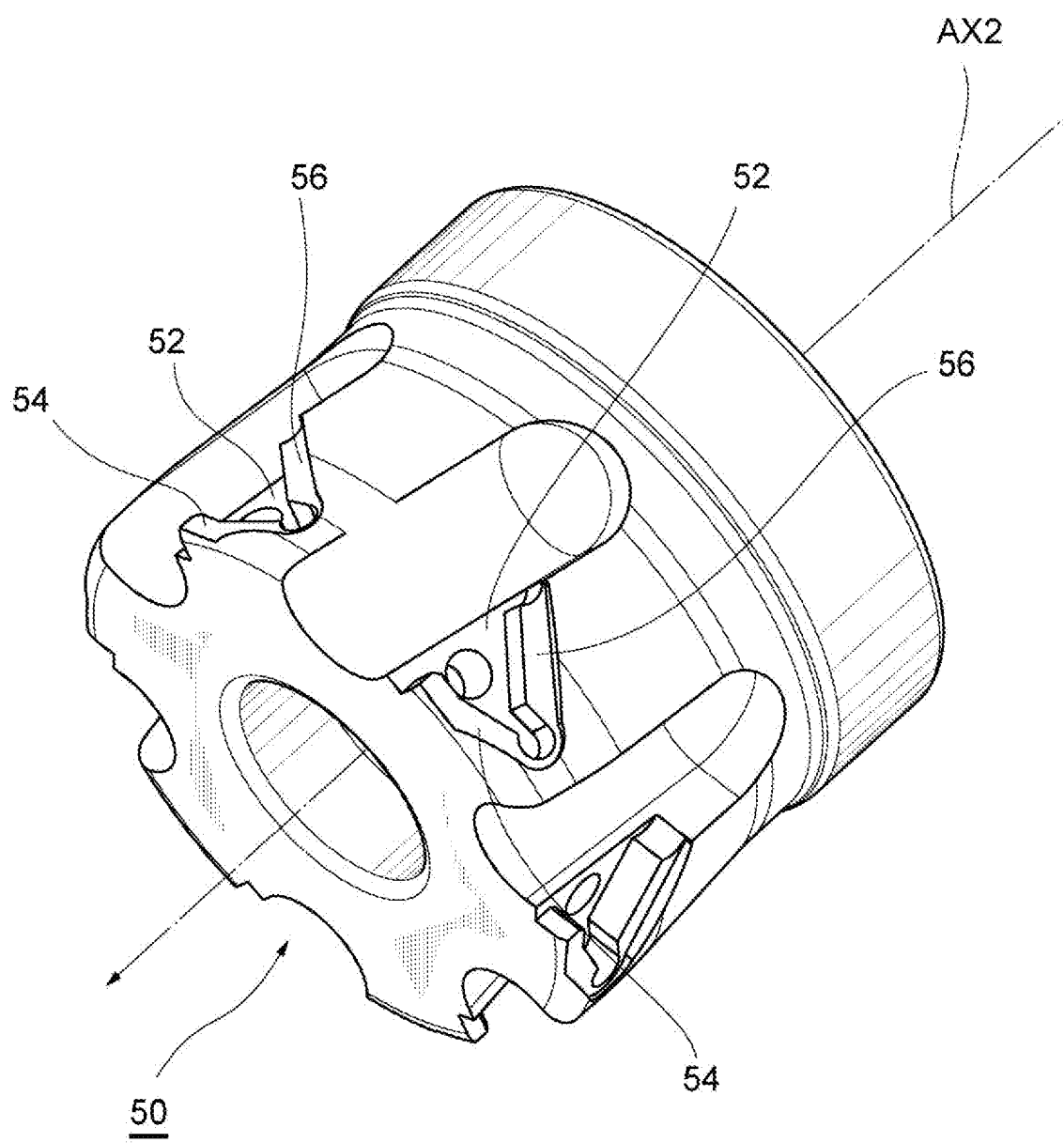
FIG. 7 is a perspective view of a body.

Subsequently, a milling cutter 100 including the cutting insert 10 and the body 50 will be described. FIG. 6 is a perspective view of the milling cutter 100. FIG. 7 is a perspective view of the body 50.

As illustrated in the drawings, a plurality of the cutting inserts 10 are attached to the body 50. Further, the cutting insert 10 is pressed against the body 50 by a male screw 60 which is inserted through the through hole H and screwed into a female screw formed in the body 50. As illustrated in FIG. 7, a bottom surface 52 abutting on the second end surface 14, a first jaw portion 54 abutting on the first restraint surface 26A21 and a second jaw portion 56 abutting on the third sub-restraint surface 26C22 when the cutting is performed using the second main cutting edge 18B are formed in an attachment part of the cutting insert 10. The length of the body 50 in a circumferential direction (rotational direction) with reference to a rotation axis AX2 in a portion abutting on the first restraint surface 26A21 by the first jaw portion 54 is larger than that when the first jaw portion 54 is not formed. Therefore, the rigidity of the body 50 can be increased. Further, it is possible to suppress the positional deviation due to the cutting resistance of the cutting insert 10.

The present disclosure can be variously modified without departing from the spirit thereof. For example, the cutting insert 10 may be attached to the body using a lever inserted into the through hole H. Further, the cutting insert 10 may be used for another milling tool such as an end mill. The present disclosure may be provided for the cutting insert having other polygonal shapes such as a quadrangular shape in addition to the triangular shape. Further, within the scope of the ordinary creativity of those skilled in the art, some of the constituent elements in the embodiment may be deleted or replaced with other constituent elements.

What is claimed is:

1. A cutting insert comprising:
a first end surface;
a second end surface;
a through hole being formed to penetrate the first end surface and the second end surface;
a first peripheral side surface connected to the first end surface and the second end surface;
a second peripheral side surface which is connected to the first end surface, the second end surface, and the first peripheral side surface, and is formed to be rotationally symmetric to the first peripheral side surface with respect to a central axis of the through hole;
a third peripheral side surface which is connected to the first end surface, the second end surface, and the second peripheral side surface, and is formed to be rotationally symmetric to the second peripheral side surface with respect to the central axis of the through hole;
a first main cutting edge formed at a connection portion between the first end surface and the first peripheral side surface;
a second main cutting edge formed at a connection portion between the first end surface and the second peripheral side surface; and
a third main cutting edge formed at a connection portion between the first end surface and the third peripheral side surface, wherein
the first peripheral side surface includes
a first rake surface adjacent to the first main cutting edge, and
a first concave surface which is connected to the second end surface and is formed to be recessed from the first rake surface toward the central axis of the through hole,
the first concave surface has a first restraint surface provided at a position where a distance between the first restraint surface and the second main cutting edge is smaller than a distance between the central axis of the through hole and the second main cutting edge when viewed from a direction parallel to the central axis of the through hole,
the second peripheral side surface has a second concave surface and a second restraint surface formed to be rotationally symmetric to the first concave surface and the first restraint surface with respect to the central axis of the through hole, respectively,
the third peripheral side surface has a third concave surface and a third restraint surface formed to be rotationally symmetric to the second concave surface and the second restraint surface with respect to the central axis of the through hole, respectively,
wherein
the first concave surface has
a first bottom surface facing the same direction as the second end surface, and
a first wall surface standing up from the first bottom surface and connected to the second end surface,
the first wall surface has the first restraint surface,
the first restraint surface has a first flat surface portion, and
an angle formed between the first flat surface portion and the second main cutting edge is −40 degrees or more and 40 degrees or less when viewed from the direction parallel to the central axis of the through hole.

2. The cutting insert according to claim 1, wherein
the second peripheral side surface is formed to be rotationally symmetric to the first peripheral side surface by 120 degrees,
the third peripheral side surface is formed to be rotationally symmetric to the second peripheral side surface by 120 degrees,
the first peripheral side surface is formed to be rotationally symmetric to the third peripheral side surface by 120 degrees, and the cutting insert further comprises
a first sub-cutting edge formed at a connection portion between the first peripheral side surface and the second peripheral side surface,
a second sub-cutting edge formed at a connection portion between the second peripheral side surface and the third peripheral side surface, and
a third sub-cutting edge formed at a connection portion between the third peripheral side surface and the first peripheral side surface.

3. The cutting insert according to claim 1, wherein
the first concave surface has a first sub-restraint surface provided at a position where a distance between the first sub-restraint surface and the second main cutting edge is larger than the distance between the central axis of the through hole and the second main cutting edge when viewed from the direction parallel to the central axis of the through hole,
the second concave surface has a second sub-restraint surface formed to be rotationally symmetric to the first sub-restraint surface with respect to the central axis of the through hole, and
the third concave surface has a third sub-restraint surface formed to be rotationally symmetric to the second sub-restraint surface with respect to the central axis of the through hole.

4. The cutting insert according to claim 1, wherein
when viewed from the direction parallel to the central axis of the through hole, the first flat surface portion is formed to be closer to the second main cutting edge as the first flat surface portion is farther from the first main cutting edge.

5. The cutting insert according to claim 1, wherein
the first wall surface has a first sub-restraint surface provided at a position where a distance between the first sub-restraint surface and the second main cutting edge is larger than the distance between the central axis of the through hole and the second main cutting edge, when viewed from the direction parallel to the central axis of the through hole,
the first sub-restraint surface has a first sub-flat surface portion, and
when viewed from a direction facing the second end surface parallel to the central axis of the through hole, an angle of the first sub-flat surface portion with respect to the first flat surface portion is 0 degrees or more and 90 degrees or less.

6. A milling tool comprising:
the cutting insert according to claim 1; and
a body which rotates about a rotation axis and to which the cutting insert is attached.

* * * * *